US008934749B2

(12) United States Patent
Hotoleanu et al.

(10) Patent No.: US 8,934,749 B2
(45) Date of Patent: Jan. 13, 2015

(54) FIBER STRUCTURE AND A METHOD FOR DISCRIMINATING HIGH ORDER MODES IN THE FIBER STRUCTURE

(75) Inventors: Mircea Hotoleanu, Lohja (FI); Emil Voiculescu, Cluj-Napoca (RO); Bogdan Ghete, Zalau (RO)

(73) Assignee: Liekki Corporation, Lohja (FI)

(*) Notice: Subject to any disclaimer, the term of this patent is extended or adjusted under 35 U.S.C. 154(b) by 0 days.

(21) Appl. No.: 12/164,264

(22) Filed: Jun. 30, 2008

(65) Prior Publication Data

US 2009/0324168 A1 Dec. 31, 2009

(51) Int. Cl.
*G02B 6/36* (2006.01)
*G02B 6/02* (2006.01)
*H01S 3/08* (2006.01)
*H01S 3/067* (2006.01)

(52) U.S. Cl.
CPC ........ *G02B 6/02023* (2013.01); *H01S 3/08045* (2013.01); *H01S 3/06729* (2013.01)
USPC ............................ 385/124; 385/126; 385/127

(58) Field of Classification Search
USPC ...................... 385/28, 123–128, 30
See application file for complete search history.

(56) References Cited

U.S. PATENT DOCUMENTS

| 6,931,187 | B2 * | 8/2005 | Kim et al. ...................... 385/124 |
| 7,171,091 | B1 * | 1/2007 | Ward ............................. 385/125 |
| 7,356,233 | B2 * | 4/2008 | Fini .............................. 385/126 |
| 7,570,856 | B1 * | 8/2009 | Minelly et al. ................ 385/126 |
| 8,204,349 | B2 * | 6/2012 | Gapontsev et al. ........... 385/127 |
| 2009/0059353 | A1 * | 3/2009 | Fini ............................. 359/341.3 |
| 2009/0060437 | A1 * | 3/2009 | Fini et al. ...................... 385/127 |
| 2010/0157418 | A1 * | 6/2010 | Dong et al. ................. 359/341.3 |
| 2010/0195194 | A1 * | 8/2010 | Chen et al. ................. 359/341.3 |

* cited by examiner

Primary Examiner — Hemang Sanghavi
(74) Attorney, Agent, or Firm — Young & Thompson

(57) ABSTRACT

The invention relates to a fiber structure (700), which has one or more refractive index disturbances (750, 760) outside a fiber core (710) for discriminating one or more high order modes in the fiber structure. The invention also relates to a method for discriminating one or more high order modes, an arrangement having the high order modes discriminating fiber structure, and a device having the high order mode discriminating fiber structure.

15 Claims, 4 Drawing Sheets

FIBER STRUCTURE AND A METHOD FOR DISCRIMINATING HIGH ORDER MODES IN THE FIBER STRUCTURE

TECHNICAL FIELD OF THE INVENTION

The invention relates to a fiber structure for discriminating high order modes. The invention also relates to a method for discriminating high order modes in a fiber structure. Furthermore, the invention relates to an arrangement comprising a fiber structure for discriminating high order modes.

BACKGROUND OF THE INVENTION

In the recent years, optical fibers have evolved rapidly, which has allowed the use of the fibers outside the traditional telecommunications domain. The progress has been most dynamic in manufacturing, defense, and aerospace industry where fiber lasers are gradually replacing the standard solid state or gas lasers by offering the same or better performance at lower cost and new applications.

The transition from telecom grade fibers to fibers for laser applications involved many design and fabrication changes such as new dopants, new geometries, new structures, and new coating materials. In most of the fiber laser applications, there are two very important fiber design parameters that define the fiber quality. The first one is a maximum optical power handling capability and the second one is a beam quality.

Since silica has been established as an optimum raw material for optical fibers, when the overall characteristics such as availability, cost, and processing knowledge, in order to increase a maximum available power in a fiber laser, one should increase the cross-sectional dimension of the waveguide (the core diameter of the fiber). This reduces the power density and thus a higher total power may be generated or carried by the fiber. However, if the core diameter exceeds some limit the beam quality will suffer due to the excitation of the high order modes. Consequently, there is a fundamental tradeoff between the maximum power and the beam quality for traditional step index fibers.

Several techniques have been developed, which affect the beam quality, for increasing the power handling capability. The standard method is to reduce a refractive index difference between the core and the cladding of the fiber. This reduces the number of higher order modes supported and thus increases the beam quality. However, this method is limited by the fact that lowering the refractive index difference increases the macrobending losses of the fiber, so, its applicability is limited.

Another technique uses bending losses for mode discriminations. Since the bending induced losses are mode dependent, a carefully designed bending radius will yield high losses for high order modes and low losses for a fundamental mode. This method is also limited by the fact that a fiber lifetime decreases as the bending radius decreases.

One way to discriminate the high order modes in a fiber is a technique, which uses the control of refractive index and/or active doping profiles. By careful profile design the high order modes will experience different gain in the fiber. However, this technique requires an advanced manufacturing technology.

It is also possible to use the photonic crystal fiber technology to create waveguides that are fundamentally singlemode for very large core diameters. Usually these fibers require advanced manufacturing technology and have usability issues such as difficult splicing and fragility.

In many practical applications, these aforesaid methods are combined in order to provide the best beam quality for the highest power available.

SUMMARY

One object of the invention is to provide a fiber structure enabling to discriminate high order modes, a method for discriminating high order modes in a fiber structure, and an arrangement comprising a fiber structure enabling to discriminate high order modes.

The object of the invention is fulfilled by providing a fiber structure, which comprises one or more refractive index disturbances outside a core of the fiber structure.

The object of the invention is also fulfilled by providing a method, wherein a refractive index outside a core of a fiber structure is disturbed by one or more refractive index disturbances.

The object of the invention is also fulfilled by providing an arrangement, which comprises a fiber structure having one or more refractive index disturbances outside a core of the fiber structure.

The object of the invention is also fulfilled by providing a device, which comprises a fiber structure having one or more refractive index disturbances outside a core of the fiber structure.

According to an embodiment of the invention the refractive index of the fiber cladding is modified in near proximity of a fiber core so that the modified cladding parts comprises two rings, which have a refractive index close to the refractive index of the core, surrounding the fiber core. The rings increase the power capability of the fiber by increasing the effective area of the fundamental mode and discriminating high order modes.

According to an embodiment of the invention a refractive index outside a core of a fiber structure, is disturbed by one or more refractive index disturbances, which variations provide a maximised expansion disturbance effect for high order modes and a minimised expansion effect for a fundamental mode.

The term "refractive index disturbance" refers to means for disturbing or suppressing high order modes in the fiber structure in order to achieve the better power capability of the fiber.

According to an embodiment of the invention the refractive index disturbing comprises modifying a mode field distribution of high order modes, whereupon the high order modes field distribution expands and a fundamental mode remains relatively unchanged or confined.

According to an embodiment of the invention the refractive index disturbing, which is disclosed in any of the previous embodiments, comprises a spatial overlap reducing between the fundamental mode and the high order modes in the fiber structure, whereupon the high order modes substantially propagate outside the core and the central peaks of the high order modes are reduced.

According to an embodiment of the invention said one or more refractive index disturbances, which are disclosed in any of the previous embodiments, are arranged into a cladding of the fiber structure, so that the part of the fiber cladding forms the one or more refractive index disturbances in near proximity of the outer surface of the fiber core.

According to an embodiment of the invention said one or more refractive index disturbances, which are disclosed in any of the previous embodiments, comprises a first refractive index disturbance surrounding the core and a second refractive index disturbance surrounding the first refractive index disturbance. The first refractive index disturbance forms a ring around the fiber core and the second refractive index disturbance, for one, forms a second ring around the first ring and the core. It is also possible to provide more than two rings around the core.

According to an embodiment of the invention the refractive index disturbing, which is disclosed in any of the previous embodiments, comprises a high order modes defining in the fiber structure, whereupon the fundamental mode is also defined at the same time.

According to an embodiment of the invention the refractive index disturbing, which is disclosed in any of the previous embodiments, comprises defining a radial distance from the core for the first refractive index disturbance belonging to said one or more refractive index disturbances, defining a thickness and a height of the first refractive index disturbance so that said first refractive index disturbance covers a first peak outside the core for the high order modes.

According to an embodiment of the invention the refractive index disturbing, which is disclosed in any of the previous embodiments, comprises defining a radial distance from the first refractive index disturbance belonging to said one or more refractive index disturbances for the second refractive index disturbance, defining a thickness and a height of the second refractive index disturbance so that said second refractive index disturbance covers a second peak outside the core for the high order modes having two or more radial peaks.

According to an embodiment of the invention the fiber structure, which is disclosed in any of the previous embodiments, is a multimode fiber.

According to an embodiment of the invention the fiber structure, which is disclosed in any of the previous embodiments, is doped. The fiber doping can be provided by ytterbium, erbium, thulium, neodymium or any other active dopants. The core doping profile can be either non-confined or confined. The method is also applicable to passively doped fibers. The passive doping, for one, can be provided by aluminium, germanium, phosphorus, samarium, etc.

According to an embodiment of the invention the fiber structure, which is disclosed in any of the previous embodiments, comprising at least one of the one or more refractive index disturbances is doped. The one or more refractive index disturbances can comprise e.g. high index glass and the doping of the refractive index disturbance is provided by an element that induces an absorbtion at an application wavelength, which increases the attenuation of the high order modes.

According to an embodiment of the invention the fiber structure comprises means for discriminating one or more high order modes in the fiber structure outside a core of the fiber structure. The means for discriminating refers to at least one refractive index disturbance outside the core of the fiber.

The method according to embodiments of the invention differs from other methods describing the selective modal gain or radial variation of the waveguide refractive index.

A prior art describes a confined structure where the fiber core is only partially doped in the central area and thus providing more gain for the fundamental mode than for some of the high order modes.

The method according to the embodiments of the invention is different, because the gain discrimination is created by changing the overlap between modes and not by changing the doping distribution.

The Bragg effect based fiber, which is mainly used as a wavelength filter, includes many high index rings surrounding the core of the fiber.

However, the method according to embodiments of the invention differs from the Bragg fiber in the working principle and in the application of the fiber. While the Bragg fiber requires that the rings are very thin (on the scale of the wavelength) and a large number in order to create the Bragg effect, the method according to the embodiments of the invention does not have such requirements. In fact the rings have to be large enough to prevent the Bragg effect that would change the fiber behavior. In addition, the purpose of the method according to the embodiments of the invention is the higher order mode discrimination and not the wavelength filtering as in the Bragg fiber.

The method offers a simple approach to fiber tuning and enables an improved beam quality since fiber gain may be spatially localised in an area covered by a fundamental mode, a spatial filtering becomes relatively easy, and a bending loss for the high order modes increases.

The method offers also possibility to preserve the higher order mode discrimination and increase the effective area of the fundamental mode by tuning the design parameters, and thus increasing the power capability of the fiber and potentially reducing the onset of non-linear effects.

The method does not reduce a fiber lifetime and it does not increase the bending sensitivity of the fundamental mode as the existing methods. Besides, it provides a higher degree of high order discrimination than the existing methods.

BRIEF DESCRIPTION OF THE DRAWINGS

Next, the aspects of the invention will be described in greater detail with reference to exemplary embodiments in accordance with the accompanying drawings, of which

DETAILED DESCRIPTION

Figure 1:
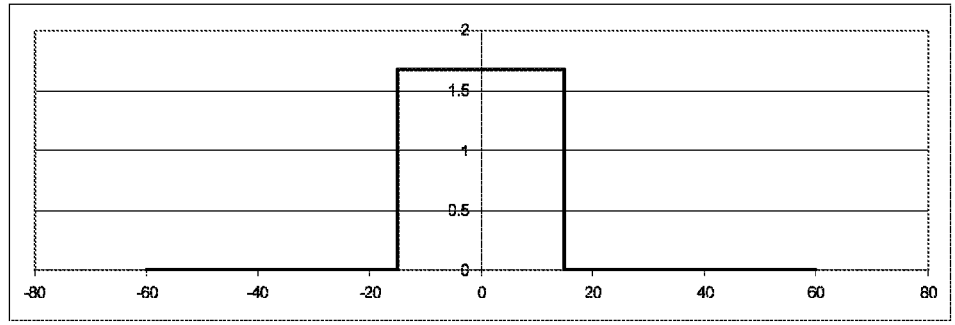
FIG. 1 illustrates a view of the refractive index profile of the fiber.

FIG. 1 illustrates a refractive index profile for a standard step index fiber belonging to multimode fibers. The fiber comprises a large diameter fiber core, which is significantly greater than the wavelength of the used light, and a cladding surrounding the core.

Figure 2:
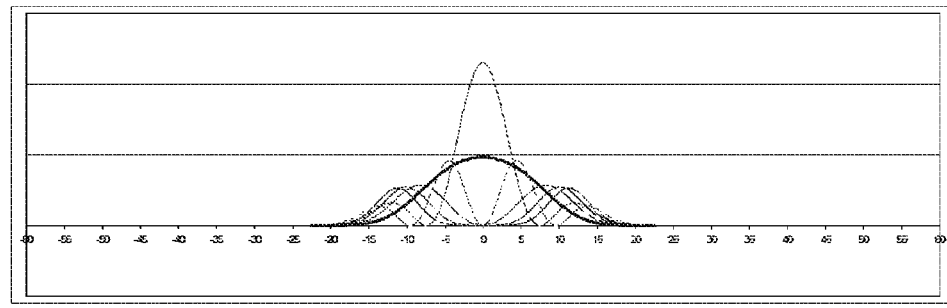
FIG. 2 illustrates a view of a modal distribution inside the fiber.

In FIG. 2 is illustrated a mode field distribution inside the standard step index fiber, which refractive index profile is represented in FIG. 1. It can be seen from the modal distribution, which represents an optical signal spreading because of different propagation velocities of the modes, that there is a significant spatial overlap between a fundamental mode and high order modes. In addition, FIG. 2 reveals that the mode penetration outside the core increases as the mode order number increases.

Figure 3:
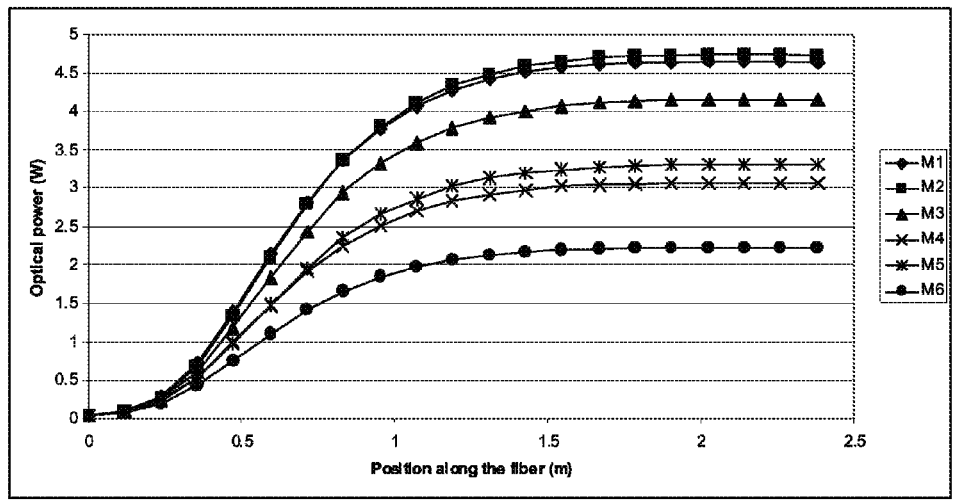
FIG. 3 illustrates a view of a modal propagation inside the fiber.

FIG. 3 presents curves showing the gain for both fundamental mode M1 and high order modes M2-M6 relating to the same standard step index fiber. As one can see, there is the significant gain for all modes inside the fiber core.

In some cases the gain is higher for high order modes M2-M6 than fundamental mode M1. For example, second order mode M2 has a higher gain than fundamental mode M1. This is because it has a larger effective area inside the core than fundamental mode M1 and it is placed mostly outside the fundamental mode peak but still inside the doped area.

Since the penetration of the high modes outside the core increases along with the mode order number, it is possible to place a disturbance outside the core, but in proximity to it, whereupon the disturbance produces a stronger effect for the high order modes than the fundamental mode.

The following embodiment of the invention shows that by carefully designing the refractive index disturbance outside the fiber core, the mode field expansion can be maximised for the high order modes and minimised for the fundamental mode. The designing should be provided so that the high order mode field distribution is significantly expanded outside the core area while the fundamental mode remains strongly inside the core area.

Figure 4:
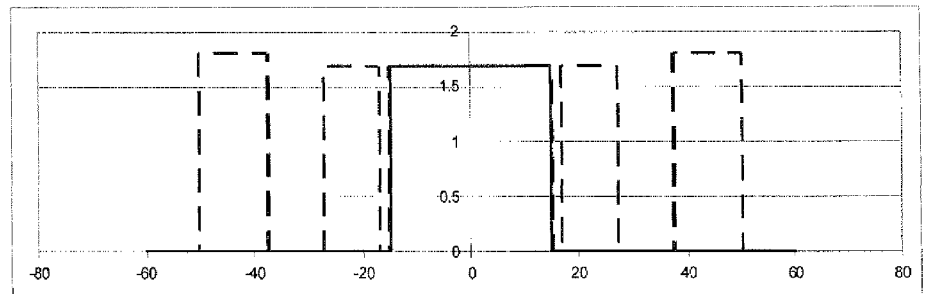
FIG. 4 illustrates a view of the refractive index profile of the fiber comprising two rings according to an advantageous embodiment of the invention, FIG. 5 illustrate a view of a modal distribution inside the fiber comprising two rings according to an advantageous embodiment of the invention.

In FIG. 4 is illustrated the refractive index profile of the one possible fiber design for discriminating high order modes. A fiber includes a fiber core, which is identical with the core of the standard step index fiber presented in FIG. 1, a cladding, and two rings (dashed lines), which surround the core.

A first ring is arranged in near proximity to the core and a second ring is arranged to surround both the core and the first ring. The rings have a refractive index close to the refractive index of the core. The core may be doped with ytterbium or other active dopants while the rings are not doped with active elements, but it is also possible to dope the rings with passive elements.

Also in this embodiment, the refractive index of the cladding between the core and the first inner ring and between the first and the second ring is same way as in FIG. 1 clearly lower than the refractive index of the core and the rings.

This kind of fiber can be manufactured e.g. by a Direct Nanoparticle Deposition (DND) method, which is applicable for manufacturing large mode area fibers having any radial distribution of active element concentration and any refractive index profile.

Figure 5:
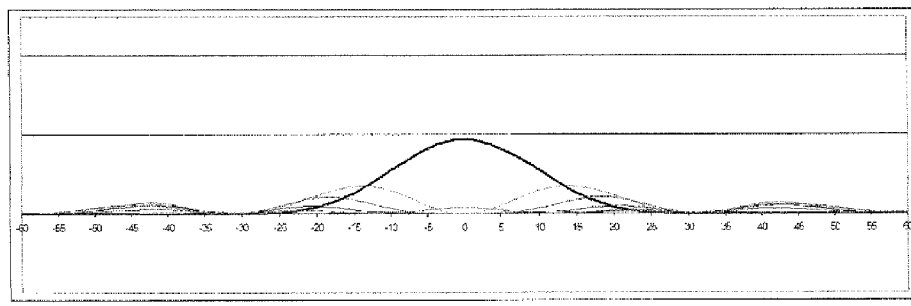

FIG. 5 presents a mode field distribution for the fiber design illustrated in context of the previous figure. Now, one can see that the higher order modes substantially propagate outside the core area and the central peaks of the higher order modes are lower than before because of the rings forming the refractive index disturbance in the cladding. So, the high order modes overlap with a fundamental mode and with a core area has outstandingly been reduced if it is compared with the overlap of the standard step index fiber.

Figure 6:
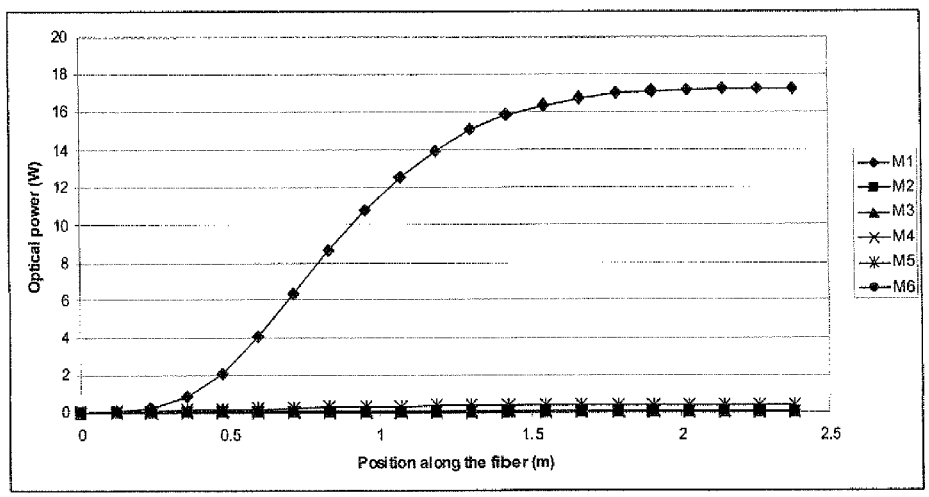
FIG. 6 illustrates a view of a modal propagation inside the fiber comprising two rings according to an advantageous embodiment of the invention.

Next, in FIG. 6, is illustrated the gain of the modes propagating in the fiber structure comprising the ytterbium doped core and two rings in an amplifier set up. The curves indicate that most output power is accumulated into fundamental mode M1 while the gain of high order modes M2-M6 are almost non-existent.

Thus, it is demonstrated by simulation that there is a very high discrimination for high order modes when two rings of high index glass are applied around the ytterbium doped fiber core. The radial dimensions and the refractive index of the rings have been carefully designed so that the sought after effect is maximised. The fiber is then placed in a fiber amplifier and the output power of propagating modes is calculated and compared with the power generated by a similar fiber but without the rings. The amplifier built with the new fiber shows much lower power in high order modes and thus much better beam quality.

Figure 7:
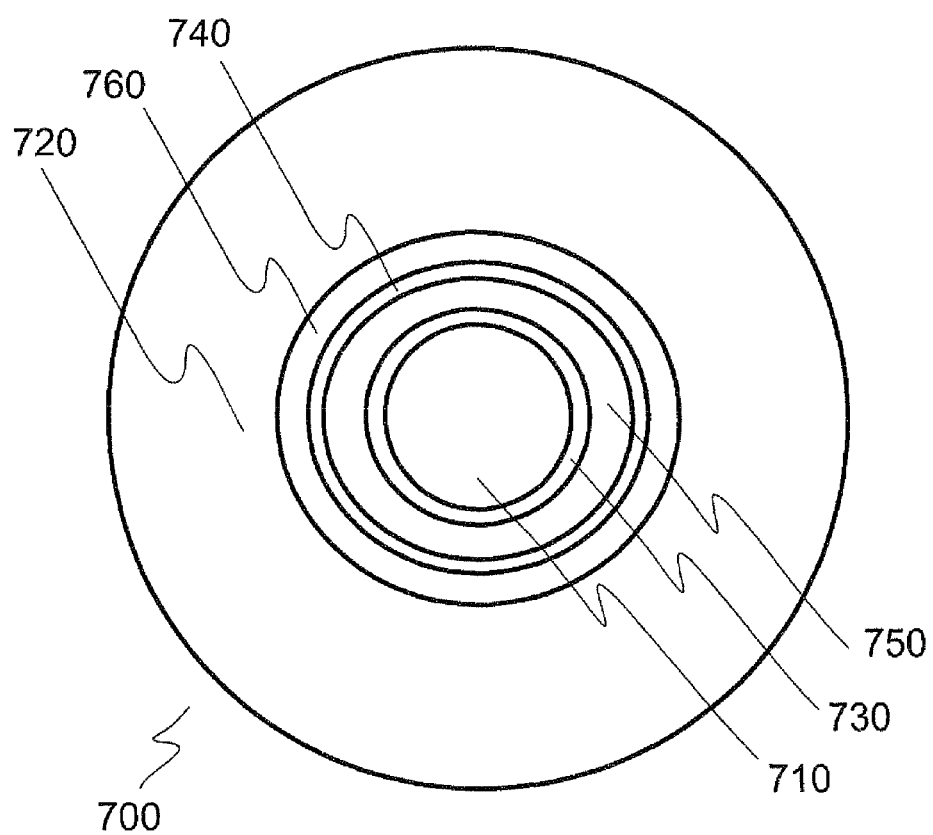
FIG. 7 illustrates an exemplary view of the fiber structure according to an advantageous embodiment of the invention.

FIG. 7 illustrates the cross-section of the fiber design according to the embodiment of the invention, wherein fiber structure 700, e.g. a large mode area fiber, comprises actively doped core 710 having a certain refractive index and cladding 720, 730, 740 consisting of pure silica having a lower refractive index than the core refractive index.

First ring 750 and second ring 760 are placed inside cladding 720 in order to disturb the high order modes. Both rings 750, 760 consisting of e.g. high refractive index glass passively doped and have refractive indexes which are same or essentially same as the core refractive index and higher than the cladding refractive index. However, it is good to notice that the refractive index of first ring 750 is not necessarily exactly the same as the refractive index of second ring 760.

In the figure is presented just one example of possible fiber designs. Alternative fiber designs can be e.g. a fiber having three or more rings, rings and a non-flattop core refractive index, rings and a non-confined core refractive index and a doping profile, rings and a non-flattop core refractive index and a non-confined doping profile, and rings and the special design of the core refractive index profile and a doping profile.

The guideline for the ring design is that first ring 750 should cover a first peak outside core 710 for the high order modes, a gap between rings 750, 760 should cover a deep in between first and second peaks outside core 710 of the high order modes, and second ring 760 should cover the second peak outside core 710 for the high order modes.

Figure 8:
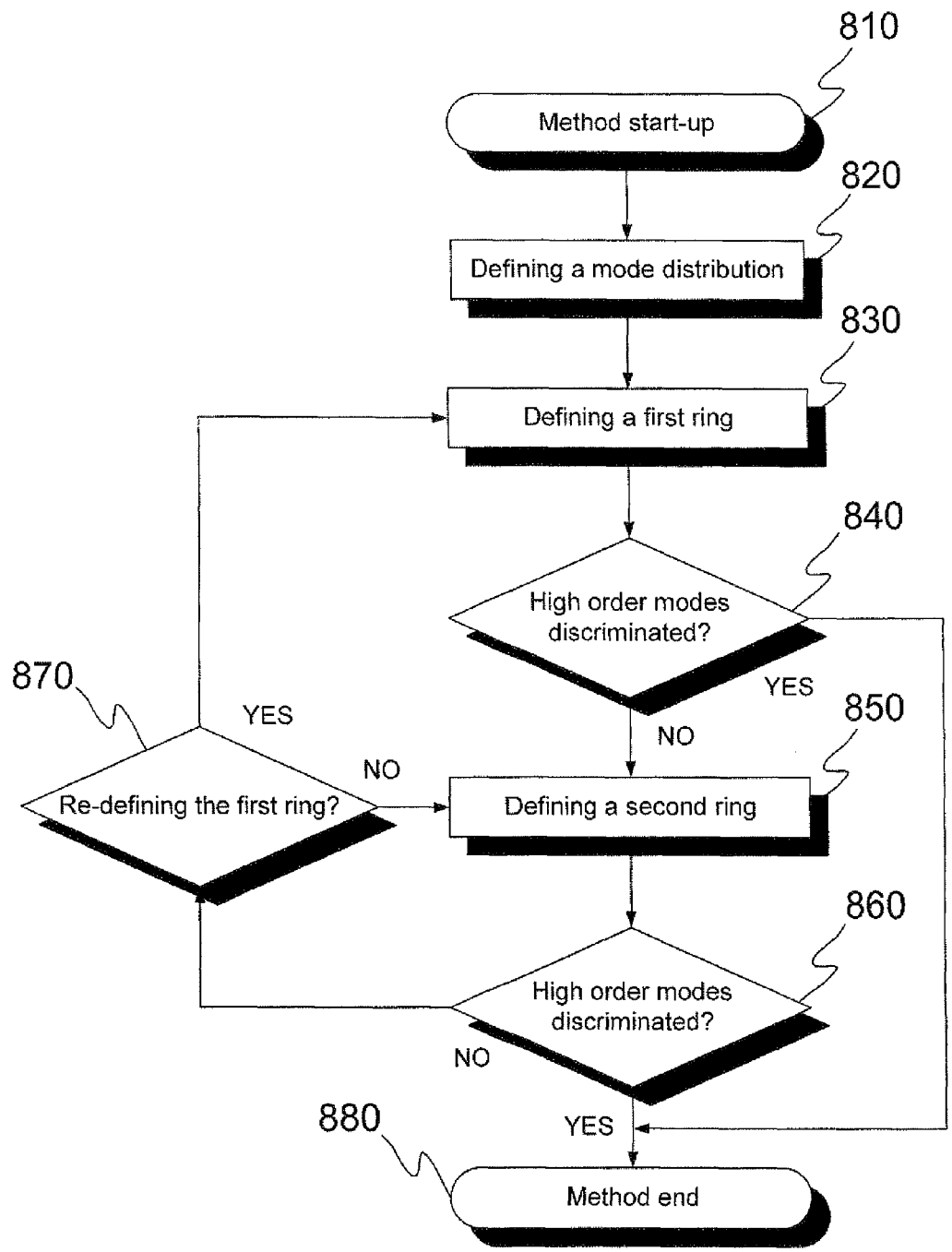
FIG. 8 illustrates an exemplary flowchart of the method for discriminating high order modes according to an advantageous embodiment of the invention.

FIG. 8 discloses, by means of an example only, a flowchart describing a method according to the embodiment of the invention.

During the method start-up in step 810, the device and/or application, such as an appropriate simulation software executing the method, is turned on and necessary stages before a real simulation, such as a simulation set up definition and different variables and parameters initialisation, are provided.

In this case, a user defines the set up, variables, and parameters in view of a standard step index fiber.

Next, in step 820 the simulation according to the defined set up, variables, and parameters is started. The simulation calculates a modal distribution inside the fiber, preferably a large mode area fiber, for the defined standard step index fiber and indicates the result to the user on the display device of the computer executing the simulation software.

In step 830, the user defines on the grounds of the displayed modal distribution a place and ring dimensions for a first ring by calculating a radial distance between a core and the first ring, a ring thickness, and a ring height (a refractive index). The radial distance between the outer wall of the core and the inner wall of the ring is optimised when a ratio between high order modes overlap with the ring and a fundamental mode overlap with the ring is maximised. This ensures that the ring has the strongest effect on the higher order modes while minimizing the effect on the fundamental mode. The ring should cover a first radial peak outside the core for the high order modes. The ring thickness is less critical, but it should be large enough to cover the first radial peak of the high order modes and it should avoid to extend over the first minimum observed for the modes with at least two radial peaks.

After the first ring definition, the user may execute another calculation cycle in order to see the effect of the first ring in step 840. If the high order mode discrimination by means of the first ring succeeded, the execution of the method is ended in step 880.

Optionally step 840 can be bypassed and the user can directly define the properties of the second ring.

In step 850, the user defines on the grounds of the modal distribution displayed in step 820 or 840 a place and ring dimensions for the second ring by calculating a radial distance between the first ring and the second ring, a ring thickness, a ring height (the refractive index).

The second ring design affects mostly the high order modes having two or more radial peaks. The distance between the rings is optimised when the second ring covers in the modal distribution a minimum between a first and second radial peak of the modes having at least two radial peaks. The thickness of the second ring should cover the second peak of those modes. A refractive index difference can be adjusted on the high order mode side since the effect of this ring on the fundamental mode is virtually zero, but a higher refractive index has a stronger effect on the second peaks of the high order modes.

In step 860 the user estimates a need for further improvement in the ring design and if there is need for further improvement, is possible to return to step 830 or 850.

In the case of further improvement, the user chooses which one of the rings he/she want to re-define in step 870.

When the ring design is successfully completed, the design process is ended in step 880.

Naturally, the aforesaid design process can include further steps for defining one or more supplementary rings to the fiber structure.

The above described fiber structure can be utilised in various kind of applications and arrangements such as continuous wave and pulsed single mode high power lasers and single mode high power amplifiers for MOPA systems.

The invention has been now explained above with reference to the aforesaid embodiments and the several advantages of the invention have been demonstrated. It is clear that the invention is not only restricted to these embodiments, but comprises all possible embodiments within the spirit and scope of the invention thought and the following patent claims.

The invention claimed is:

1. A solid fiber structure comprising:
a large mode area fiber, a fiber structure of the large mode area fiber comprising,
a fiber core doped with rare earth doping; and
solid glass rings surrounding the fiber core,
wherein the solid glass rings are configured to provide a gain discrimination between a fundamental mode and one or more higher order modes of a mode field distribution so that an effective area of the fundamental mode increases, and
wherein a radial distance from the fiber core to a first of said solid glass rings, and a thickness and a height of the first of the solid glass rings are defined so that said first of the solid glass rings covers a first peak outside the fiber core for the high order modes, and a radial distance from the first of the solid glass rings to a second of said solid glass rings, and a thickness and a height of the second of the solid glass rings are defined so that said second of the solid glass rings covers a second peak outside the fiber core for the high order modes, the first of the solid glass rings covering the first peak, a gap between the first and second solid glass rings covering a deep in between the first and second peaks, and the second of the solid glass rings covering the second peak.

2. The solid fiber structure according to claim 1, wherein said solid glass rings are configured to modify the mode field distribution of the one or more higher order modes.

3. The solid fiber structure according to claim 1, wherein said solid glass rings are configured to reduce a spatial overlap between the fundamental mode and the higher order modes in the fiber structure.

4. The solid fiber structure according to claim 1, wherein said solid glass rings are arranged into a cladding of the fiber structure.

5. The solid fiber structure according to claim 1, wherein the first of said solid glass rings is a first refractive index disturbance glass ring surrounding the fiber core and the second of the sold glass rings is a second refractive index disturbance glass ring surrounding the first refractive index disturbance glass ring.

6. The solid fiber structure according to claim 5, further comprising a cladding for the fiber structure, wherein said first refractive index disturbance glass ring has a first refractive index differing from a refractive index of the cladding and the second refractive index disturbance glass ring has a second refractive index differing from the refractive index of the cladding.

7. The solid fiber structure according to claim 5, wherein said first refractive index disturbance glass ring has a first refractive index and the second refractive index disturbance glass ring has a second refractive index,
wherein a refractive index of the fiber core is the same or essentially the same as the first refractive index and the second refractive index.

8. The solid fiber structure according to claim 1, wherein said fiber structure is a multimode optical fiber.

9. An arrangement comprising the solid fiber structure according to claim 1.

10. A method for preparing a large mode area fiber with a solid fiber structure that has a fiber core and solid glass rings, the method comprising:
doping the fiber core with rare earth doping; and
surrounding the fiber core of the large mode area fiber with the solid glass rings that are configured to provide a gain discrimination between a fundamental mode and one or more higher order modes of a mode field distribution so that an effective area of the fundamental mode increases,
wherein a radial distance from the fiber core to a first of said solid glass rings, and a thickness and a height of the first of the solid glass rings are defined so that said first of the solid glass rings covers a first peak outside the fiber core for the high order modes, and a radial distance from the first of the solid glass rings to a second of said solid glass rings, and a thickness and a height of the second of the solid glass rings are defined so that said second of the solid glass rings covers a second peak outside the fiber core for the high order modes, the first of the solid glass rings covering the first peak, a gap between the first and second solid glass rings covering a deep in between the first and second peaks, and the second of the solid glass rings covering the second peak.

11. The method according to claim 10, further comprising modifying the mode field distribution of the one or more higher order modes.

12. The method according to claim 10, further comprising reducing a spatial overlap between the fundamental mode and the one or more higher order modes.

13. The method according to claim 10, wherein said solid glass rings are arranged into a cladding of the fiber structure.

14. The method according to claim 10, further comprising defining the one or more higher order modes in the fiber structure.

15. A solid fiber structure comprising:
- a fiber core (710) providing a large mode area fiber and having an actively doped core with a first refractive index;
- solid glass rings (750, 760) surrounding the fiber (710) core; and
- plural cladding rings (720, 730, 740) surrounding the fiber core (710), each cladding ring consisting of pure silica having a lower refractive index than the first refractive index,
- a first cladding ring (730), of the cladding rings, in contact with the fiber core (710),
- a first solid glass ring (750), of the solid glass rings, in contact with first cladding ring (730),
- a second cladding ring (740), of the cladding rings, in contact with the first solid glass ring (750),
- a second solid glass ring (760), of the solid glass rings, in contact with second cladding ring (740),
- a third cladding ring (720), of the cladding rings, in contact with the second solid glass ring (760),
- the first solid glass ring (750) and the second solid glass ring (760) placed inside the third cladding ring (720) in order to disturb higher order modes, the first and second solid glass rings (750, 760) consisting of high refractive index glass passively doped and having refractive indexes which are same or essentially same as the first refractive index and higher than the lower refractive index of the plural cladding rings (720, 730, 740) wherein i) the first and second solid glass rings (750, 760) are configured to provide a gain discrimination between a fundamental mode and the higher order modes of a mode field distribution so that an effective area of the fundamental mode increases, and ii) a radial distance from the fiber core to the first solid glass ring, and a thickness and a height of the first solid glass ring are defined so that said first solid glass ring covers a first peak outside the fiber core for the high order modes, and a radial distance from the first solid glass ring to the second solid glass ring, and a thickness and a height of the second solid glass ring are defined so that said second solid glass ring covers a second peak outside the fiber core for the high order modes, the first solid glass ring covering the first peak, a gap between the first and second solid glass rings covering a deep in between the first and second peaks, and the second solid glass ring covering the second peak.

\* \* \* \* \*